United States Patent [19]
Hiller

[11] 3,882,693
[45] May 13, 1975

[54] WATER COOLER

[75] Inventor: Donald E. Hiller, Santa Barbara, Calif.

[73] Assignee: Rayne International, Santa Barbara, Calif.

[22] Filed: Feb. 1, 1974

[21] Appl. No.: 438,869

[52] U.S. Cl............................ 62/394; 165/70
[51] Int. Cl............................ B67d 5/62
[58] Field of Search......... 62/98, 99, 185, 393, 394, 62/395, 396, 399; 165/70

[56] References Cited
UNITED STATES PATENTS

| 2,098,211 | 11/1937 | Schulse | 62/394 |
| 2,187,555 | 1/1940 | Flindt | 165/70 |
| 2,597,744 | 5/1952 | Morrison | 62/394 |

*Primary Examiner*—Meyer Perlin
*Attorney, Agent, or Firm*—Christie, Parker & Hale

[57] ABSTRACT

A water cooler having a double-tube helically wound heat-exchange coil immersed in water passing through a cooling tank. An inner tube of the coil carries refrigerant, and an outer tube surrounds and isolates the inner tube from water in the tank. The inner and outer tubes are in partial contact for improved heat transfer, but a space between the tubes provides a vent passage for refrigerant if the inner tube ruptures.

6 Claims, 7 Drawing Figures

WATER COOLER

BACKGROUND OF THE INVENTION

Home water coolers are used to provide a source of chilled and filtered water for drinking and preparation of beverages. Water from regular utility lines is filtered to remove particulates and unpleasant tasting substances, and is delivered to a sink-mounted valve after passing through a chilling unit. These coolers are popular in many households as a replacement for bottled-water units which require handling of bulky water containers.

In conventional coolers, the incoming water is circulated through a metal container having refrigerant cooling coils secured to its outer surface. Heat transferred from the water to the refrigerant must therefore pass through the container wall and the limited contact area of the container and cooling coil. This is an inefficient heat transfer mechanism, but has heretofore been thought necessary due to the need for providing a double barrier between the refrigerant and the water. The double barrier protects against water contamination by the refrigerant if the cooling coil should crack or rupture.

This invention relates to an improved cooler having a double-tube helical cooling coil which is immersed in the water being chilled. Refrigerant is circulated through an inner tube which is in partial physical contact with a surrounding outer tube. The outer tube isolates the inner tube from the water, and provides a vent path for refrigerant if the inner tube fails. Immersion of the entire coil provides a large heat-transfer surface for rapid and efficient water chilling.

SUMMARY OF THE INVENTION

The water cooler of this invention includes a container which is preferably a plastic vessel strengthened by an outer wrapping of resin-impreganted filaments such as fiberglass. A double-tube cooling coil is supported within the container to be in direct contact with water admitted to the container through an inlet tube. A refrigerating means such as a conventional compressor-condenser system is connected to an inner tube of the cooling coil to circulate refrigerant fluid therethrough for chilling the water.

An outer tube of the cooling coil surrounds the inner tube to isolate the inner tube from water in the container and thereby prevent water contamination by refrigerant fluid if the inner tube should leak. The inner and outer tubes are formed as a helical coil within the container, and the tubes are in partial contact with each other to provide efficient heat transfer from the water to the refrigerant fluid. The outer tube terminates outside the container, and is adapted to be vented to atmosphere should the inner tube fail.

DESCRIPTION OF THE PREFERRED EMBODIMENT

Figure 1:
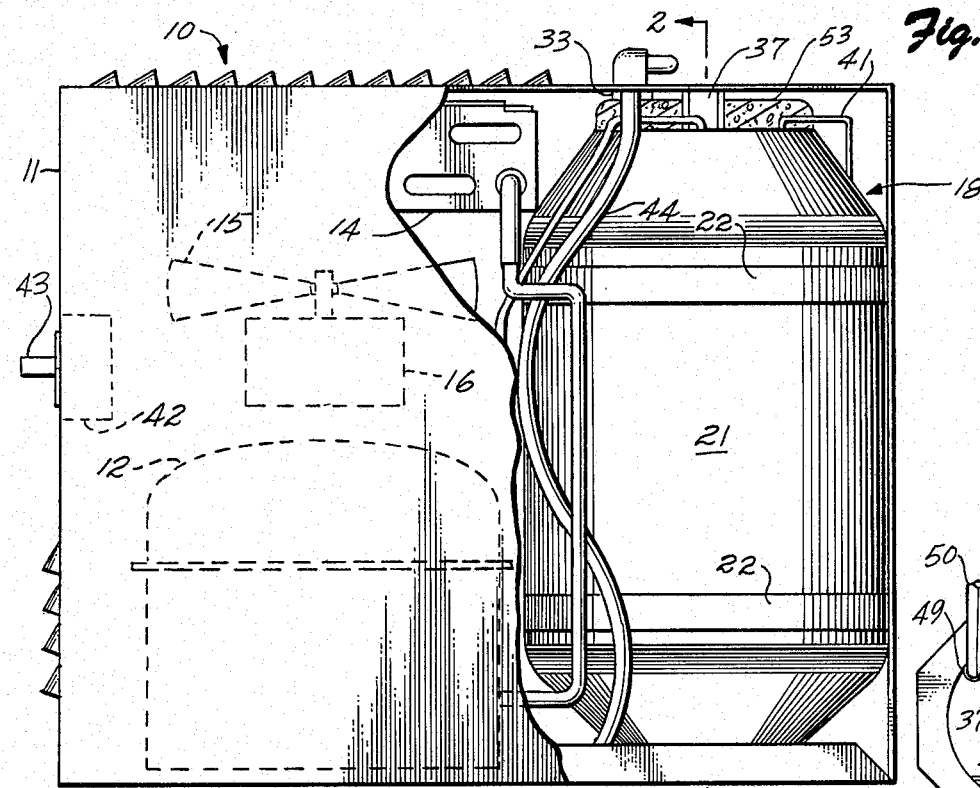
FIG. 1 is a side elevation, partly broken away, of a water cooler according to the invention.

Referring to FIG. 1, a water cooler 10 includes a sheet-metal housing 11 having louvered top and side panels so air may circulate freely therethrough. In a presently preferred construction, the housing measures approximately 8 by 15 by 18 inches so it may be conveniently positioned beneath a kitchen sink to be out of the way, but readily accessible for temperature adjustment or other service.

A refrigerant compressor 12 of a conventional hermetically sealed type is supported on the base of the cooler housing. The compressor is operated by an internal drive motor of about one-sixth horsepower, and the system preferably uses a conventional working fluid such as Freon 12.

A conventional refrigerant condenser 14 is mounted at the top of housing 11, and a fan 15 and fan motor 16 are supported within the housing below the condenser to circulate outside air through the housing and over the condenser. These components are connected in conventional fashion so working fluid is delivered from the compressor to the condenser, and then through a conventional drier and capillary-tube expander (not shown) to a cooling coil as described below. Fluid from the cooling coil flows back to the compressor through an accumulator (not shown). With the exception of the cooling coil, these units are all conventional commercially available refrigeration components, and will not be described in greater detail.

Figure 2:
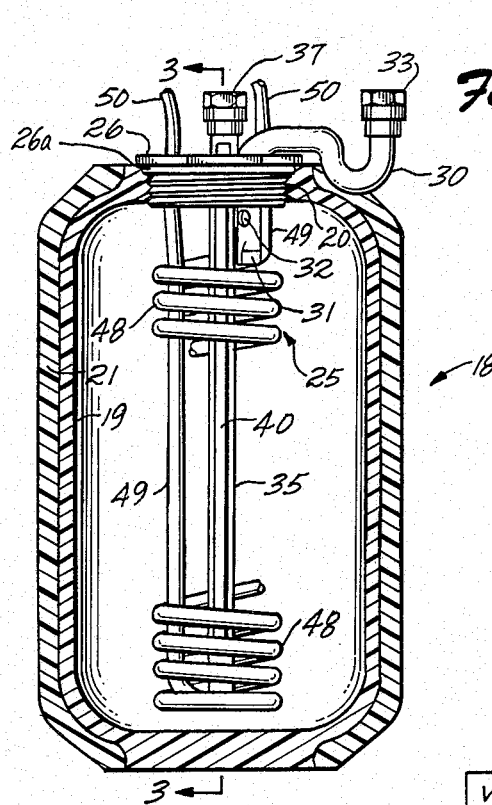
FIG. 2 is a sectional elevation of a chilling unit used in the cooler.

A chilling unit 18 is mounted at one end of housing 11 adjacent the refrigerant compressor and condenser. The chilling unit includes a flask or container 19 (FIG. 2) having a threaded opening 20 at its upper end. Preferably, a polystyrene-foam insulating jacket 21 surrounds container 19 to minimize heat transfer through the walls of the container. Jacket 21 is made in two clamshell halves, and is secured in place by a pair of straps 22.

Container 19 is preferably made from an inner liner of blow-molded ABS plastic, the liner being wrapped with an outer layer of resin-impregnated fiberglass. This material produces a rugged, strong container which is less expensive to fabricate than a metal tank, and has desirably low heat-transfer characteristics.

Figure 3:
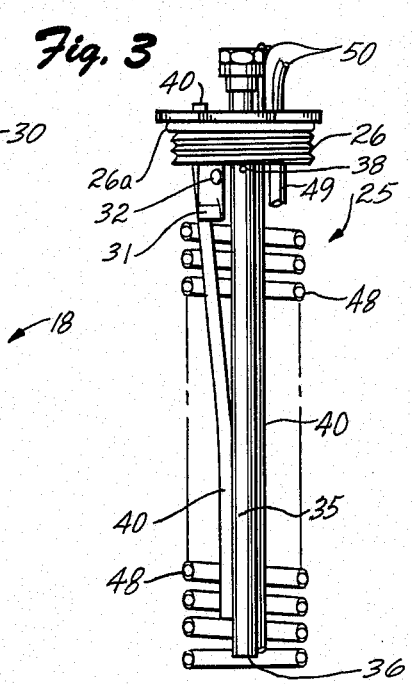
FIG. 3 is a section elevation on line 3—3 of FIG. 2 of a cooling-coil assembly used in the chilling unit.
Figure 4:
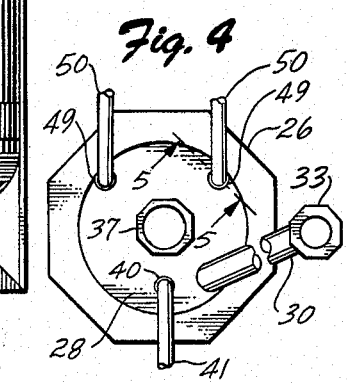
FIG. 4 is a top view of the cooling-coil assembly.

A cooling-coil assembly 25 (FIGS. 2–4) includes a threaded cap 26 which is preferably cast from brass. The cap is threaded into opening 20 against an O-ring 26a to provide a sealed closure for container 19. A depression or well 27 (FIG. 5) is formed in the central part of the cap and an integral wall 28 (FIGS. 4 and 5) extends across the bottom of the well.

A water inlet tube 30 is secured to and extends through wall 28, and lower end 31 of the tube is pinched closed. A pair of outlet ports 32 are formed through the sides of tube 30 between the bottom of cap 26 and lower end 31. The outlet ports are positioned adjacent the top of container 19 so incoming line-temperature water will be stratified at the upper part of the container, and will not warm chilled water at the bottom of the container. The upper end of the tube 30 extends laterally from the top of cap 26, and then upwardly to terminate in an internally threaded fitting 33 extending through the top of housing 11 for connection to a water supply line (not shown).

A water outlet 35 is secured to and extends through wall 28 of cap 26, and an open lower end 36 (FIG. 3) of the outlet tube extends almost to the bottom of container 19. The coldest water in the container settles to the bottom and is accordingly withdrawn through the outlet tube in preference to the warmer incoming water which stratifies at the upper part of the container.

The upper end of outlet tube 35 terminates in an internally threaded fitting 37 extending through the top of housing 11 for connection to a dispensing valve (not shown) which is typically mounted on a kitchen sink above the water cooler. A small (1/16-inch diameter) vent hole 38 (FIG. 3) is formed through the wall of tube 35 immediately adjacent the undersurface of wall 28 of the cap, and the hole permits air to escape from the container as it is being filled with water.

A tubular well 40 is secured to and extends through wall 28 of cap 26, and a lower end of the well is sealed and positioned adjacent lower end 36 of the water outlet tube. A capillary tube 41 (FIG. 4) of a conventional bellows-switch temperature controller 42 (mounted at the left side of housing 11 as shown in FIG. 1) is inserted into well 40.

The last few inches of tube 41 are undulated so the lower end of the tube contacts the inner wall surfaces at the bottom of well 40. This construction insures that the capillary tube will sense the temperature at the bottom of container 19 where the coldest water in the container will settle. Preferably, the bottom end of well 40 is brazed or otherwise secured to the bottom of water outlet tube 35 to keep the temperature-sensing capillary tube spaced from the cooling coils of assembly 25.

Temperature controller 42 is preferably adjustable so the user may select the temperature of chilled water from the cooler. An adjustment knob 43 is secured to the controller for this purpose. The temperature controller is connected in conventional fashion to energize refrigerant compressor 12 and fan motor 16 when the temperature of water in container 19 has reached a selectable upper limit. Electrical power for these components is provided through a cable 44 (FIG. 1) which extends through the top of housing 11.

Figure 5:
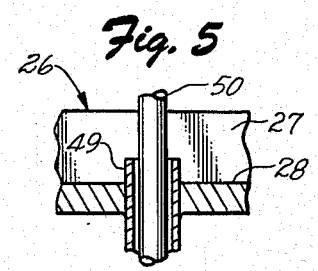
FIG. 5 is a sectional elevation on line 5—5 of FIG. 4.
Figure 6:
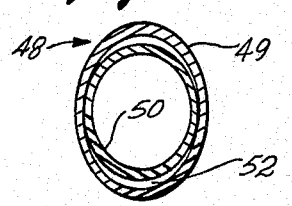
FIG. 6 is a sectional view of the double-tube cooling coil.

A double-tube helical cooling coil 48 includes an outer tube 49 and an inner tube 50 (FIGS. 5 and 6). The two ends of outer tube 49 are secured to and extend through and slightly above wall 28 of cap 26. The ends of inner tube 50 extend beyond the ends of the outer tube for connection to the refrigeration system as already described. Refrigerant fluid from the condenser, drier and capillary-tube expander is thus circulated through the inner tube and returned through an accumulator to the compressor.

Preferably, cooling coil 48 is assembled by slipping inner tube 50 into outer tube 49 while both tubes are straight. In a typical form, the inner tube is initially a straight length (approximately 13 feet) of ¼ inch outside diameter, 0.030-inch wall thickness copper tubing. The outer tube is a straight length (about 12 feet) of 0.272 inch inside diameter, 0.030 wall thickness copper tubing. The copper tubes should be in a hard heat-treat condition to avoid galling and jamming when the inner tube is fitted into the outer tube.

The assembled tubes are then fully annealed, and formed into a helical coil as shown in the drawings. During this forming step, the cross-sectional shape of the tubes is deformed as shown in FIG. 6. This deformation produces an intimate contact between the two tubes for good heat transfer, but still preserves a vent space 52 between the tubes through which refrigerant may flow in the event the inner tube ruptures. This space is purged with dry nitrogen gas during final assembly to remove any accumulated moisture.

After outer tube 49 is secured to cap 26 as shown in FIG. 5 vent space 52 is preferably closed by a body of putty such as Alcoa Gutter Seal. Parafin is then poured into well 27 of the cap to provide an additional barrier to water condensation which could lead to corrosion. Finally, the entire top of the chilling unit may be covered by a putty-like material 53 (FIG. 1) such as sold by Virginia Chemical Company under the designation "Permagum" to provide further thermal insulation and resistance to water condensation on the chilled refrigerant lines.

All tubing which extends inside the water container is preferably copper tubing, and tubing surfaces in direct contact with water are tin plated. This plating keeps a metallic taste from being imparted to water passing through the chilling unit.

Figure 7:
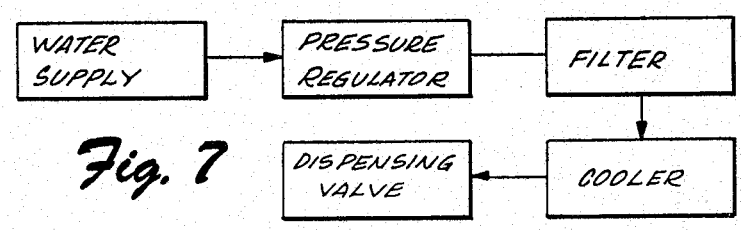
FIG. 7 is a block diagram of the components of the cooler system.

A block diagram of the entire cooling system is shown in FIG. 7. Water from the regular household supply is fed to a conventional pressure regulator to be reduced in pressure to about 25 psi. The incoming water is then fed through a filter for removal of particulates and other contaminants. This filtered incoming water is then delivered to cooler 10 where it is chilled and finally conveyed to a dispensing valve on the kitchen sink or at any other convenient location.

In operation, the incoming line-temperature filtered water fills container 19, and the elevated temperature sensed by capillary tube 41 actuates temperature control 42 which energizes the refrigerant compressor and fan motor. Refrigerant fluid is then pumped through the cooling coil to chill the water in the container. As chilled water is withdrawn through the dispensing valve from the bottom of the container, incoming line-temperature water replaces the lost volume at the top of the container, and the chilling cycle is repeated.

A unit of the size described can store one gallon of water chilled to say 40°F., and incoming water at a typical room temperature of about 70°F can be chilled to 40°F in about 20 minutes. This size unit is adequate to meet most household requirements for drinking water and the like.

In the event the inner tube of the cooling coil should fail, refrigerant is contained within outer tube 49 and flows through vent space 52 to the ends of the outer tube above wall 28 of cap 26. The pressure of the refrigerant is adequate to lift and blow away the sealing materials in the well of cap 26, and the refrigerant is accordingly vented to atmosphere without any fear of contaminating water in the container. The desired double-wall isolation of water and refrigerant is thus achieved in a simple and economically constructed unit which meets the requirements of Underwriters Laboratories and the National Refrigeration and Air Conditioning Institute with respect to safeguards in the event of refrigerant-line rupture.

An important feature of the invention is the improved heat transfer which results from immersing the cooling coil directly in the water being cooled. The double-tube cooling coil possesses good heat transfer characteristics as explained above, and the entire surface of the outer tube of the coil is in direct contact with the water. Rapid heat flow from the water to the refrigerant is thus achieved, enabling the unit to provide rapid chilling of incoming warm water.

What is claimed is:

1. A water cooler comprising:
a container for receiving water to be chilled; and
a double-tube cooling coil supported within the container to be immersed in the water to be chilled, the coil being helically wound and having an inner tube to receive a refrigerant fluid, and an outer tube which isolates the inner tube from water in the container to prevent water contamination should the inner tube fail, the outer tube having an open end venting outside the container, the inner and outer tubes having substantially uniform wall thicknesses and having cross-sections deformed into generally elliptical shape by the helical winding to place a portion of an outer surface of the inner tube in contact with a portion of an inner surface of the outer tube along the length of the helical coil.

2. The cooler defined in claim 1 and further comprising a closure cap removably secured to the container, the cap having an opening, the outer tube of the cooling coil being secured to the cap in the opening to be vented outside the container in the event of rupture of the inner tube, the cap having water inlet and outlet tubes extending therethrough into the container.

3. The cooler defined in claim 2 wherein the container is a filament reinforced plastic vessel with an opening adapted to receive the cap.

4. The cooler defined in claim 3 and further comprising a sealing means releasably closing the ends of the outer tube of the cooling coil and adapted to be ejected from the tube ends upon pressurization of the tube by leaking refrigerant fluid.

5. The cooler defined in claim 4 wherein the water inlet tube has a laterally opening outlet passage adjacent the top of the container, and the water outlet extends to adjacent the bottom of the container to draw cooled water from the container bottom.

6. The cooler defined in claim 5 and further comprising a housing enclosing the container, refrigerating means mounted in the housing and connected to the inner tube for circulating refrigerant fluid through the cooling coil, and control means including a temperature sensor supported in the container and a controller coupled to the sensor and the refrigerating means for actuating flow of refrigerant fluid at a selected water temperature.

* * * * *